Figure 1:
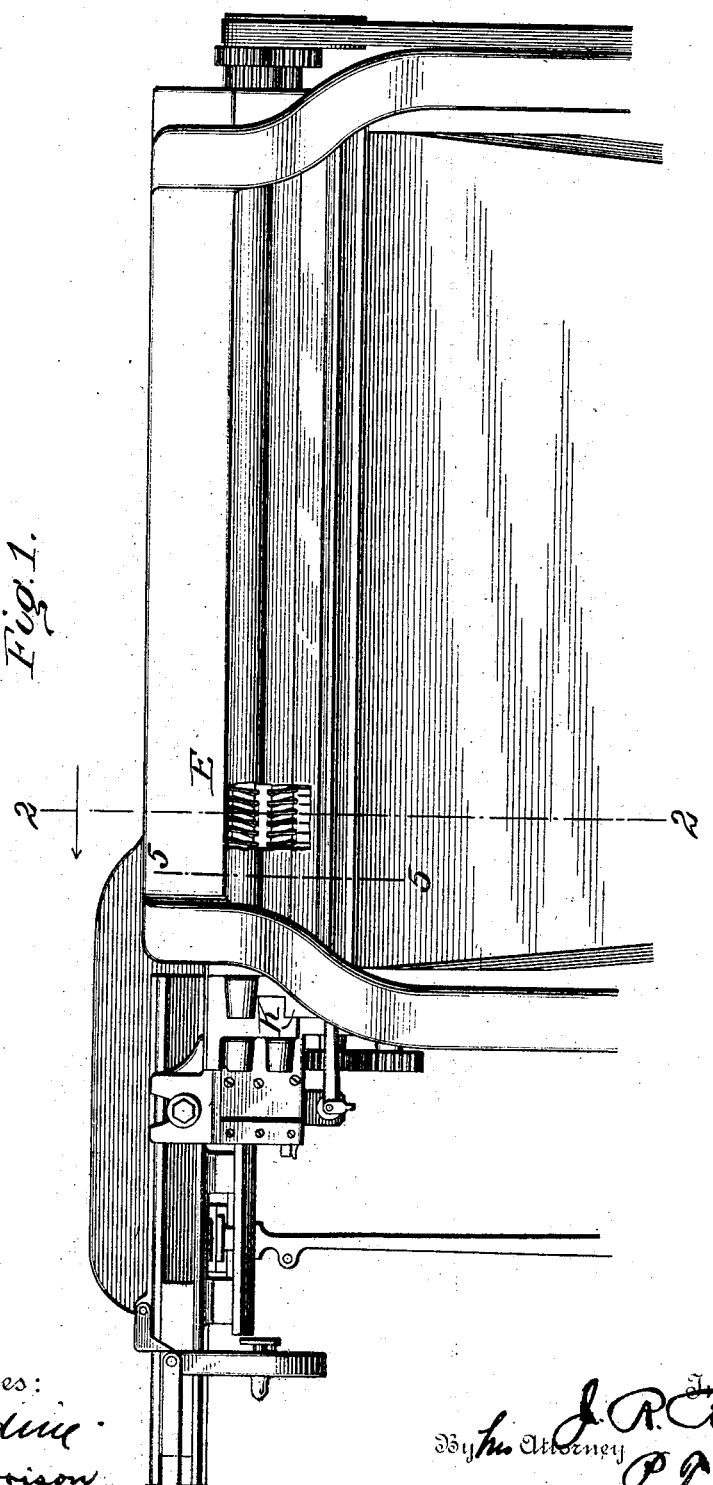

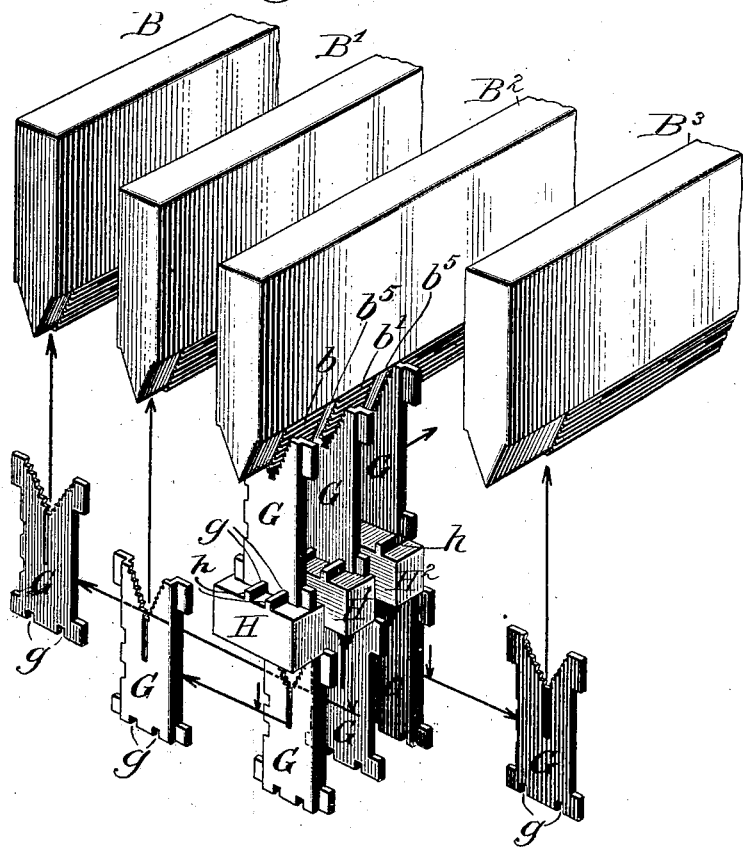
Fig. 3.
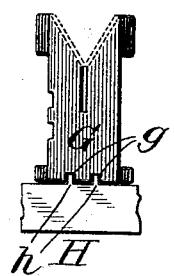 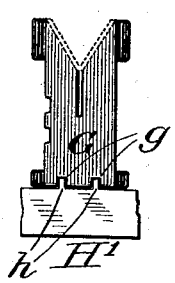 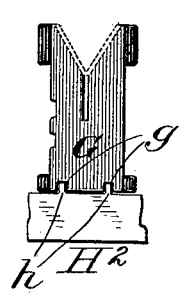 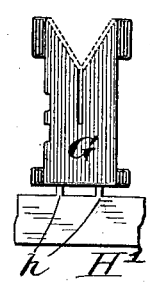
Fig. 3ᵃ.  Fig. 3ᵇ.  Fig. 3ᶜ.  Fig. 3ᵈ.

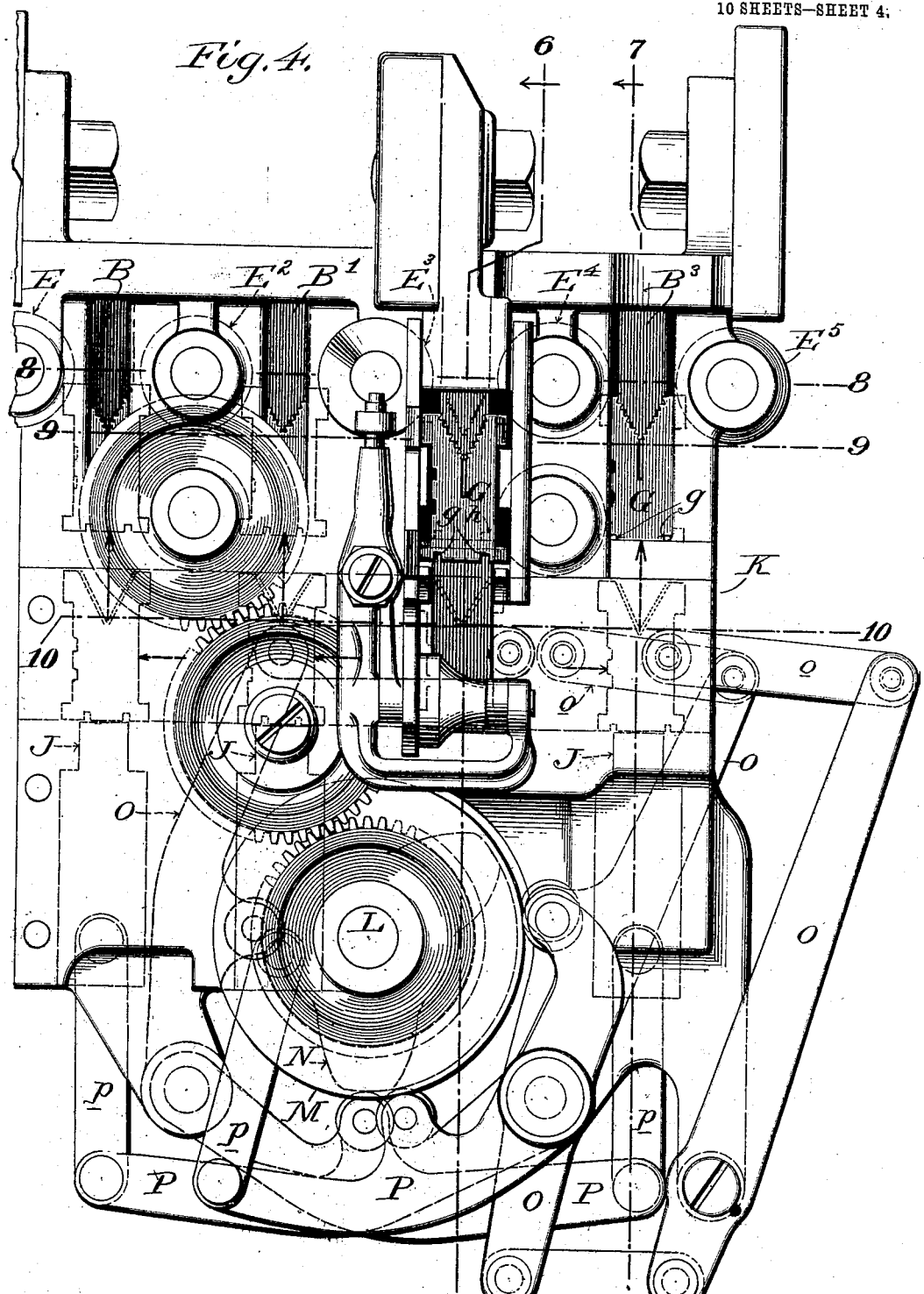

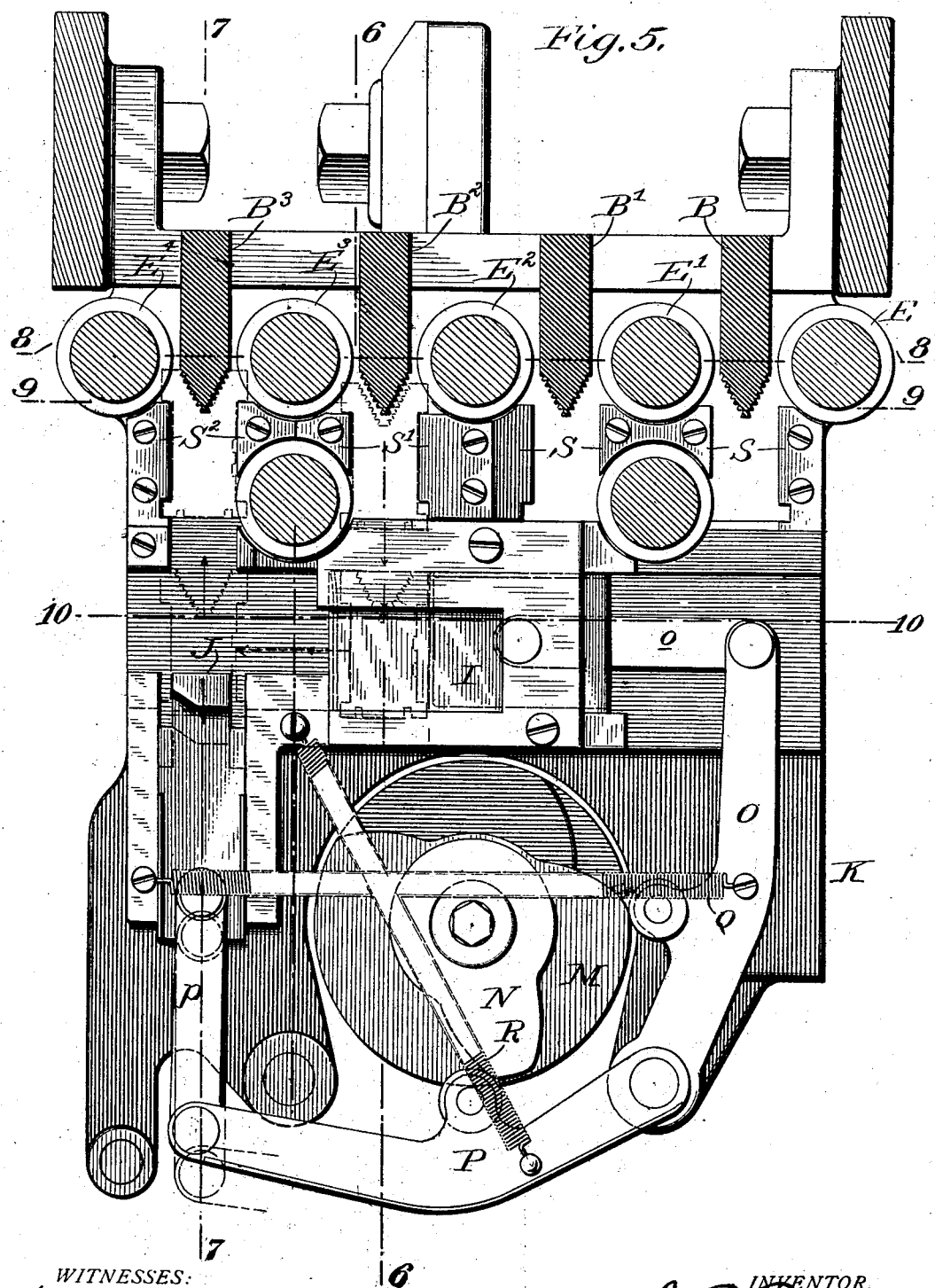

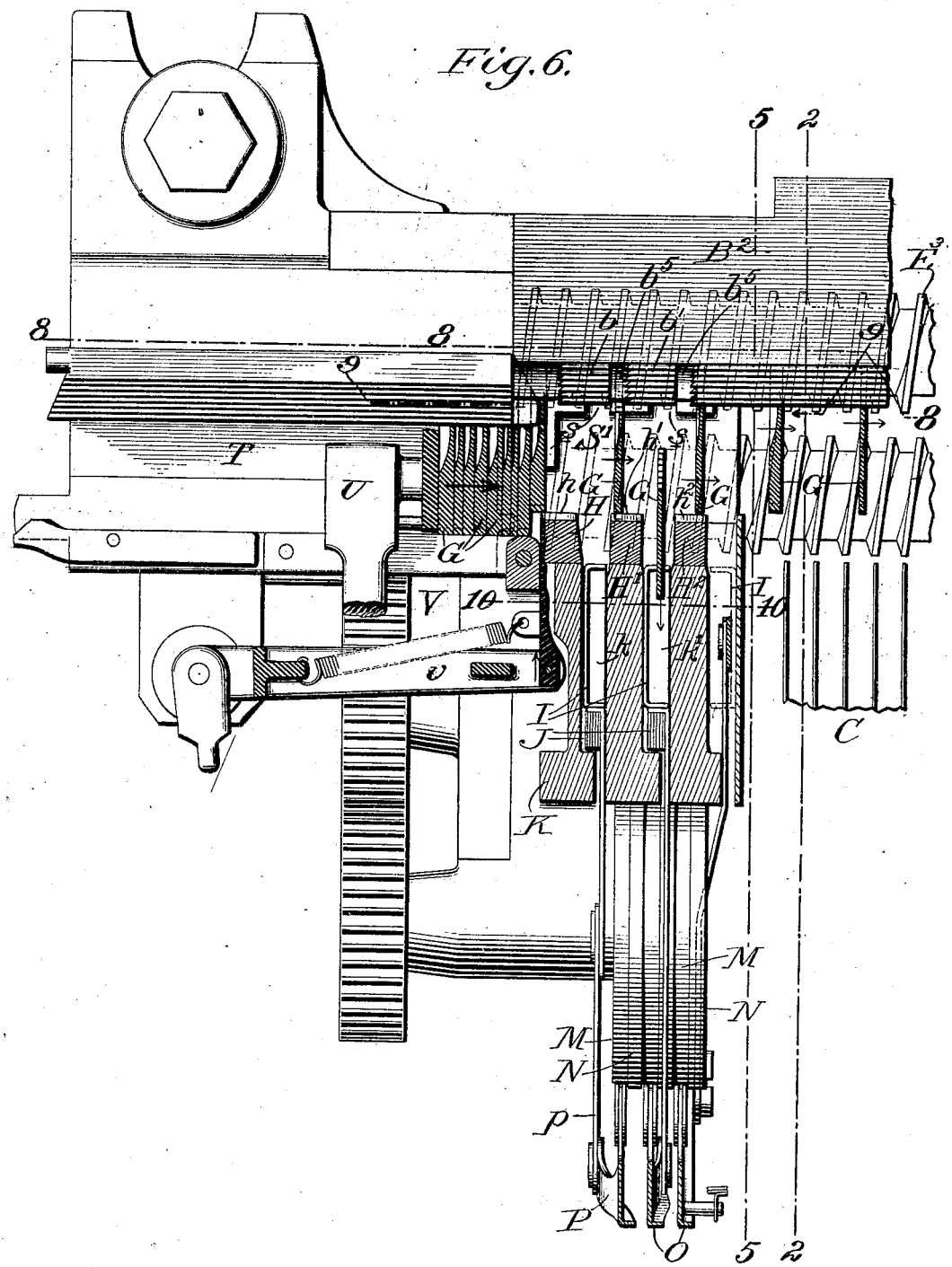

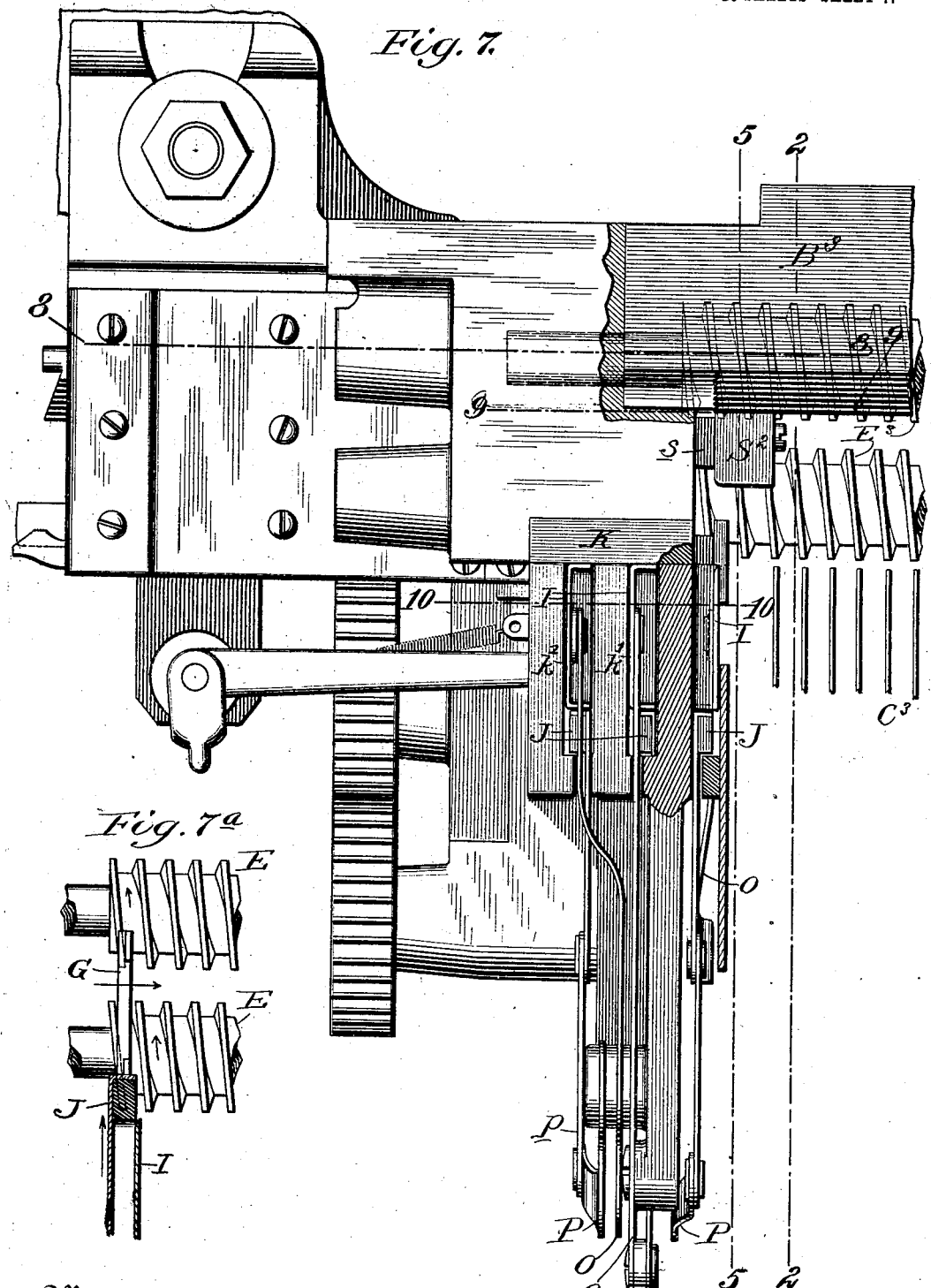

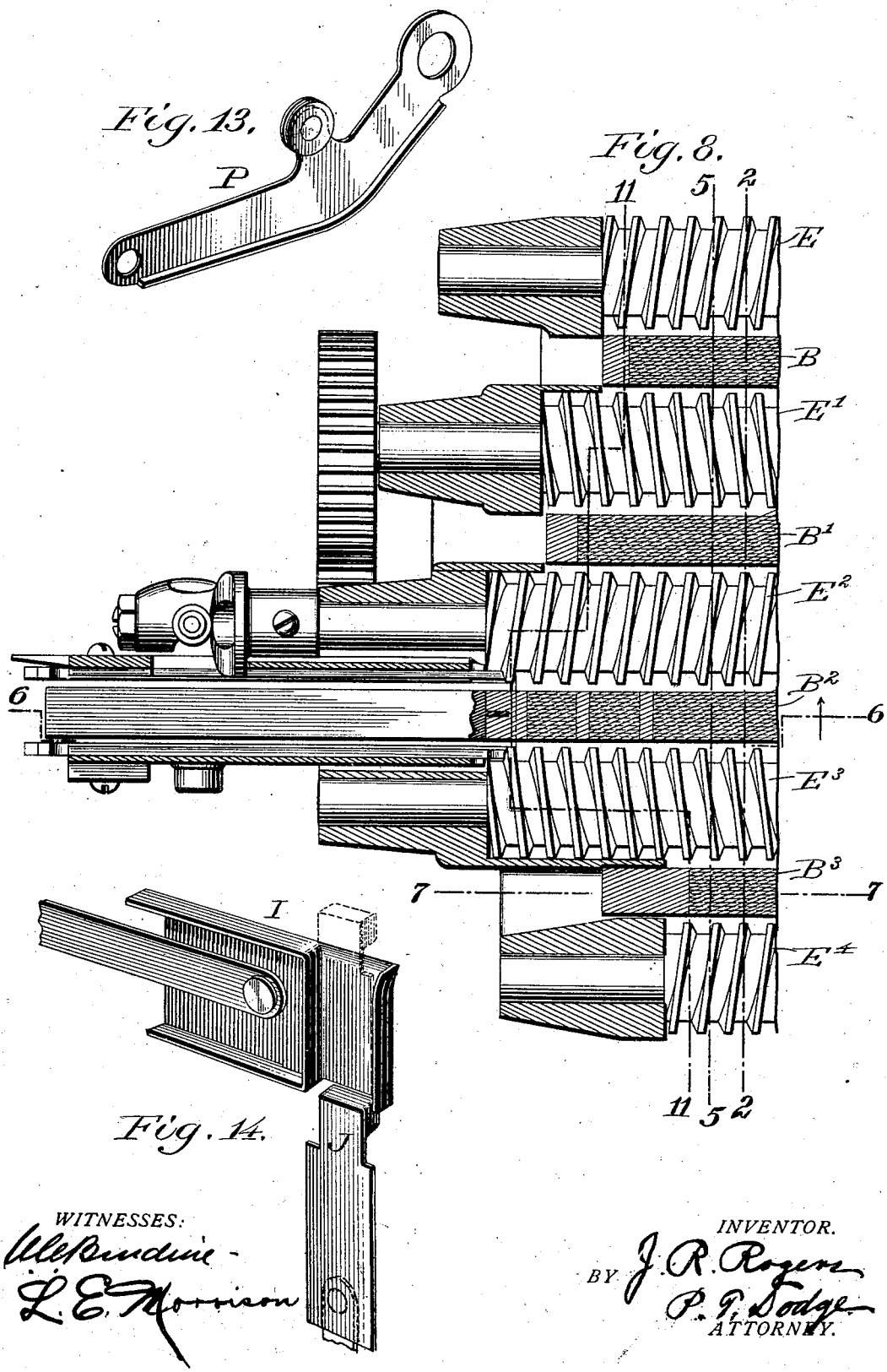

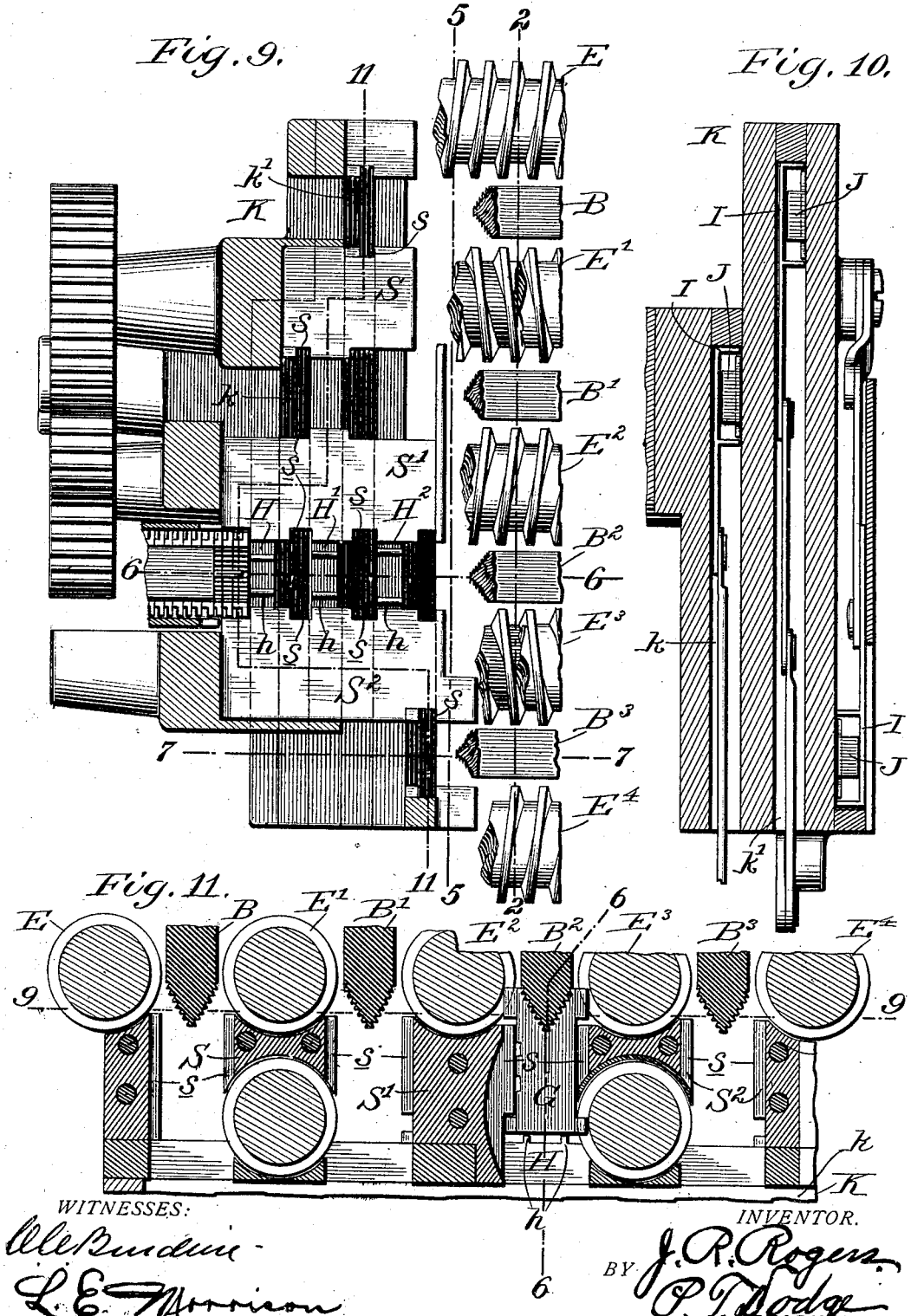

UNITED STATES PATENT OFFICE.

JOHN RAPHAEL ROGERS, OF NEW YORK, N. Y., ASSIGNOR TO MERGENTHALER LINOTYPE COMPANY, A CORPORATION OF NEW YORK.

DISTRIBUTER FOR LINOTYPE-MACHINES.

No. 890,303.   Specification of Letters Patent.   Patented June 9, 1908.

Application filed December 12, 1907. Serial No. 406,165.

*To all whom it may concern:*

Be it known that I, JOHN RAPHAEL ROGERS, of the borough of Brooklyn, county of Kings, city and State of New York, have invented a new and useful Improvement in Distributers for Linotype-Machines, of which the following is a specification.

My invention relates to a mechanism whereby a line, composed of matrices from different fonts, may be distributed or disintegrated and the individual matrices of the respective fonts delivered to corresponding distributing mechanisms by which they are delivered to their appropriate magazines.

The essence of the invention resides in means for separating the matrices according to font and delivering them to different distributers, all of each font being delivered to the same distributer.

At the present day there are known in the art linotype machines in which three, four or more magazines, containing matrices for different styles or sizes of type, are arranged to deliver these matrices to an assembling mechanism, by which they are assembled or composed in a common line for presentation to a mold in which a slug or linotype is cast against them, the matrices being thereafter returned to their magazines to be again composed in different relations in succeeding lines.

The matrices employed in my mechanism are essentially the same as those used in the commercial Mergenthaler linotype machine and represented in Letters Patent of the United States No. 436,532, each consisting of a flat plate having in one vertical edge the letter or matrix proper, and also having in the upper end a V-shaped notch with a series of distributing teeth therein, there being a special combination of teeth for each character, so that the matrices may be suspended by these teeth from the lower edge of a distributer-bar having short longitudinal teeth permuted or arranged in such manner that each matrix is held in suspension while being advanced along the main portion of the bar until it arrives over the appropriate channel in the magazine, when its teeth all disengage from the bar so that it may fall therefrom.

Preparing the matrices for use in my distributing mechanism, I provide the matrices of different fonts, except one, with notches in the lower end, all matrices of one font being notched alike, but the matrices of different fonts having notches of different sizes or in different locations. In other words, there is a special arrangement of notches for each font.

The distribution of the composed line according to font is effected by advancing the line endwise and delivering the matrices therefrom successively into engagement with one end of an overlying toothed distributer-bar, known as the preliminary distributer, with which their teeth are engaged by advancing them horizontally. The teeth of this bar are cut away in such manner that the matrices at the receiving end are repeatedly disengaged so that they will fall therefrom if not otherwise supported. Beneath the path of the advancing matrices, and beneath the untoothed portions of the bar, I locate stationary supporting bridges or selectors over which the matrices travel in their advance. The respective bridges are provided with upright ribs or wards corresponding in form and location to the notches in the matrices of different fonts, and between the successive bridges there are vertical passages or drop-channels through which released matrices may fall to carrying devices below.

As each matrix is advanced along the preliminary distributer, it is first engaged thereby and suspended by its teeth. After advancing to a certain point, its teeth are all disengaged from the bar, but at such time, it has arrived over one of the underlying bridges. If the ribs of this bridge or selector fail to correspond with the notches of the matrix, they will sustain the latter during its continued advance so that its upper teeth will again engage the distributer-bar, by which the matrix will be again supported during its advance until it arrives over the second bridge, and so on repeatedly, the matrix being supported alternately at the upper and lower ends, that is to say, by the distributer-bar above and the bridges below.

Whenever an advancing matrix is notched to correspond with the bridge to which it is advanced, the latter will fail to support the matrix and it will descend astride of the ribs far enough to prevent reëngagement at the upper end with the distributer-bar, and consequently it will, as soon as it is carried beyond the bridge, fall through an opening or drop-channel to the carrying devices below. In each of the openings into which the matrices are thus permitted to fall, I mount a horizontal carrier-slide mechanically actuated so as to carry the fallen matrix to the right or left to a definite position directly over a lifting slide, by which the matrix is carried upward to an ordinary distributing mechanism of the Mergenthaler type, consisting of a longitudinally toothed bar and adjacent feed-screws to advance the matrices along the same, as in U. S. Patent No. 347,629. There are usually three or four magazines in a machine, and one of these distributers for each magazine. All of the matrices of each font are delivered to the corresponding distributer, which in turn delivers them to their appropriate channel in the one magazine.

In the accompanying drawings I have illustrated only those parts of the machine which are directly associated with my invention, and it will be understood by those skilled in the art that the remainder of the machine may be of any ordinary or approved construction.

Figure 2:
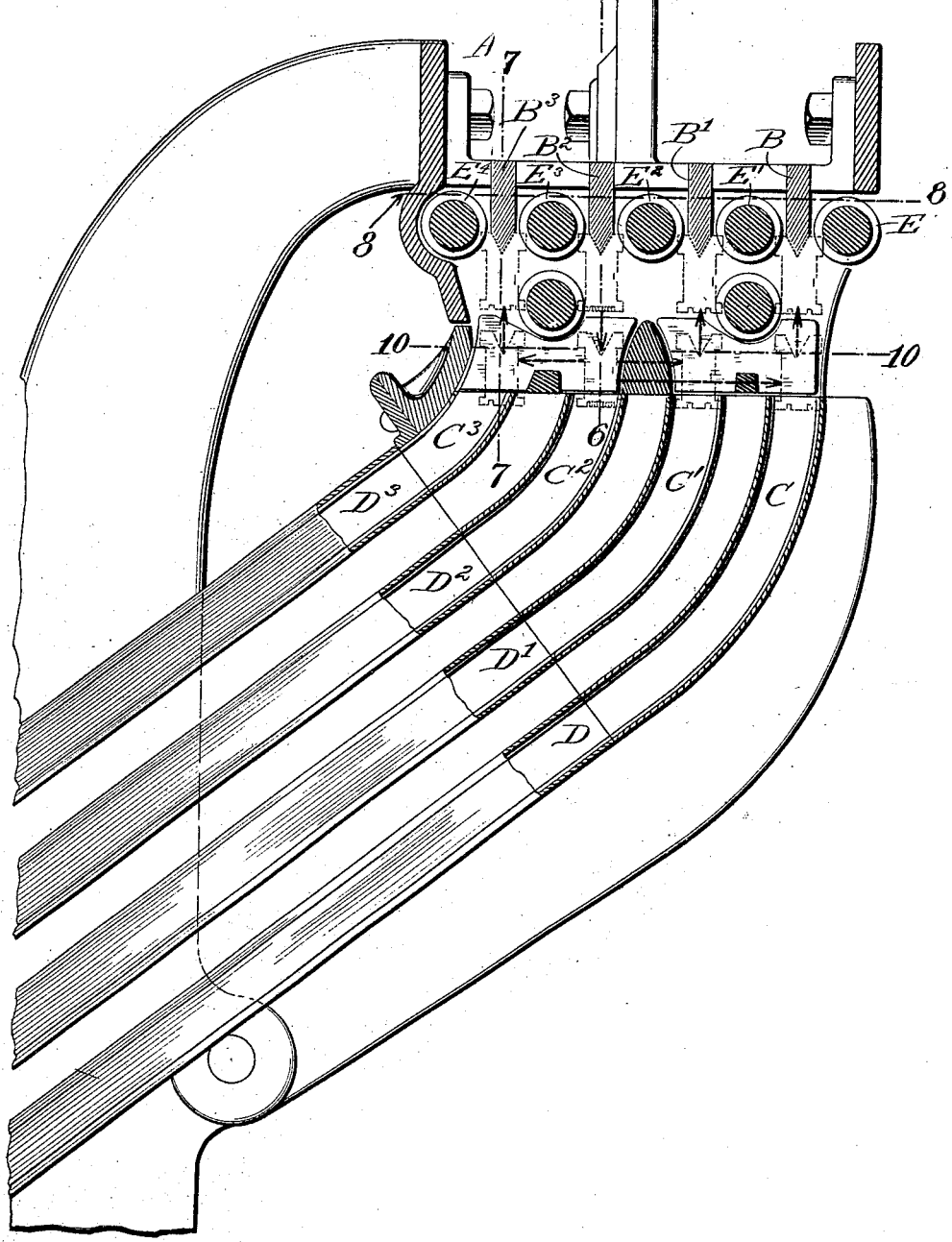
Figure 12:
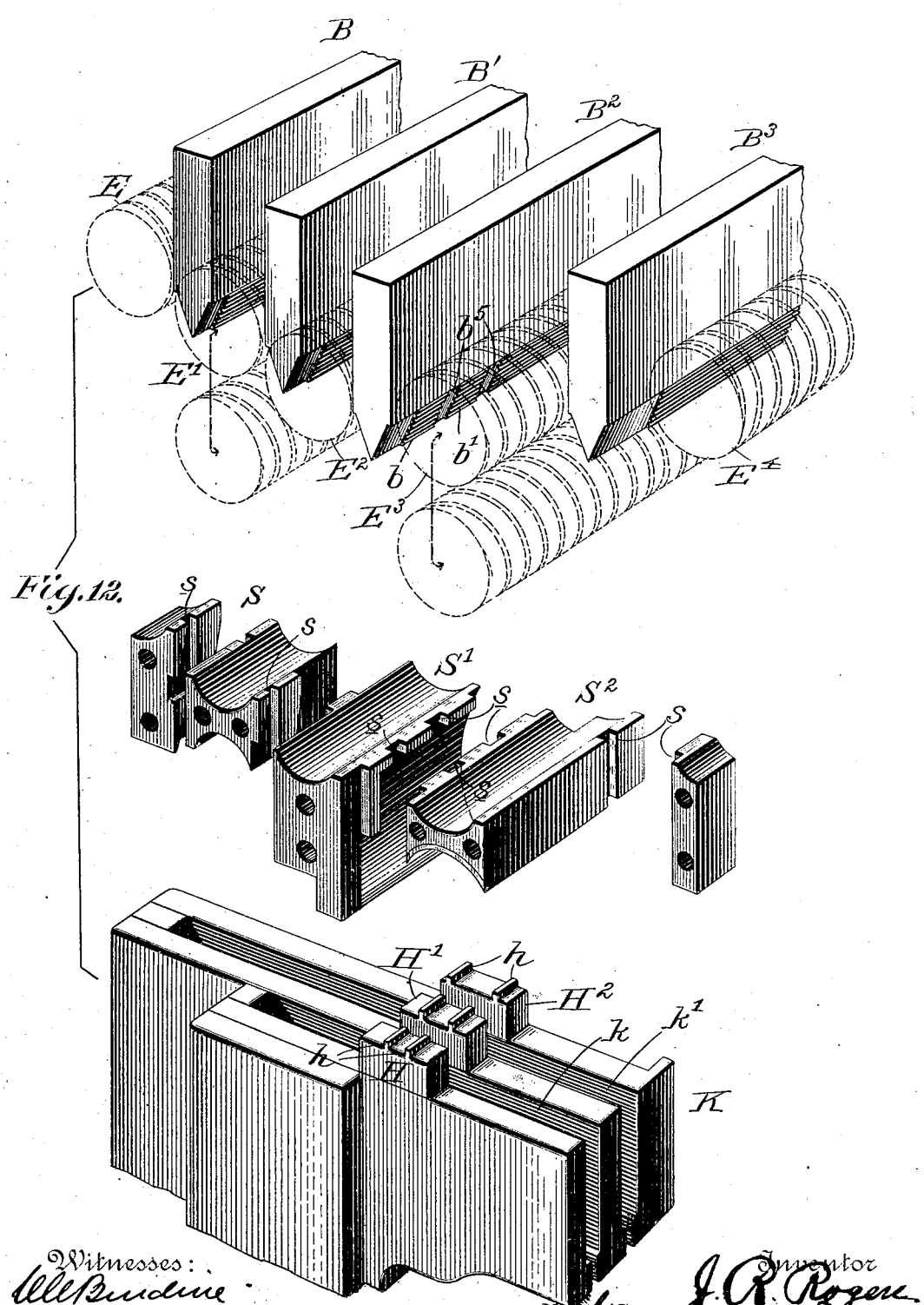

In the drawings,—Figure 1 is a front elevation of the upper part of a machine provided with my distributing mechanism. Fig. 2 is a vertical cross-section on the line 2—2 of Figs. 1, 6, 7, 8 and 9. Fig. 3 is a diagram showing in perspective the several distributer-bars, the bridges, and the course pursued by the matrices. Figs. $3^a$, $3^b$, $3^c$ and $3^d$ are views showing the different arrangement of the matrix notches for different fonts and the corresponding bridges. Fig. 4 is an end view of the mechanism looking against the left end of the apparatus, in the direction in which the matrices travel. Fig. 5 is a vertical cross-section on the line 5—5 of Figs. 1, 6, 7, 8 and 9. Fig. 6 is a longitudinal vertical section on the line 6—6 of Figs. 2, 4, 5, 8, 9 and 11. Fig. 7 is a front elevation of the receiving end of the distributer with portions broken away on the line 7—7 of Figs. 4, 5, 8 and 9. Fig. $7^a$ is an outline elevation illustrating the manner in which the matrices are lifted from the horizontal carriers between the lower feed-screws to the distributer-bar. Fig. 8 is a horizontal section on the line 8—8 of Figs. 4, 5, 6 and 7. Fig. 9 is a top plan view of the receiving end of the distributer with portions broken away on the line 9—9 of Figs. 4, 5, 6, 7 and 11. Fig. 10 is a horizontal section on the line 10—10 of Figs. 2, 4, 5, 6 and 7. Fig. 11 is a transverse vertical section on the line 11—11 of Figs. 8 and 9. Fig. 12 is a view showing in perspective the distributer-bars, screws, bridges and other leading parts of the distributer separated in order to expose their forms. Fig. 13 is a perspective view of one of the operating levers. Fig. 14 is a perspective view showing the form and relation of one of the horizontal matrix-carriers and the coöperating lift for presenting the matrix to the secondary distributer above.

Referring to the drawings, A represents a stationary framework which may be of any form adapted to sustain the various operative parts.

B, B', $B^2$ and $B^3$ are the horizontal longitudinally toothed distributer-bars, each designed to receive the matrices of one font and deliver them through the throats C, C', &c., to the corresponding inclined magazines D, D', $D^2$, &c. These distributer-bars are of the character used in commercial Mergenthaler Linotype machines, and are represented in U. S. Letters Patent No. 347,629.

E, E', &c., are the horizontal feed-screws mounted parallel with the distributer-bars in position to engage the edges of the matrices at their upper and lower ends for the purpose of moving them along the bars in a manner well understood, the arrangement being such that whenever a matrix is released by the teeth at its upper end, it can fall from the bar into the throat below without interference from the screws.

So far as described, the foregoing parts may all be of ordinary construction and arrangement.

Referring now to my improvement, the first requirement is that the matrices in the composed line shall be separated and delivered according to font to the respective distributer-bars. With this end in view, I extend one of the distributer-bars B endwise beyond the others at its receiving end, as shown in Fig. 3, and provide means for delivering all the matrices thereto. The extended end of the bar is provided at different points in its length with teeth $b$, $b'$, &c., separated by blank or untoothed portions $b^5$, so that as a matrix is advanced along the bar, it will be engaged and suspended by the successive groups of teeth but released from the bar during its travel across the intervening spaces $b^5$.

The matrices G belonging to the respective fonts, are provided in their lower ends with the special notches $g$ arranged for three of the fonts in the positions shown in Figs. $3^a$, $3^b$, and $3^c$. The matrices of the fourth font are without notches, as shown in Fig. $3^d$.

Beneath the path of the matrices as they travel along the receiving end of the bar, I range the three stationary bridges or selectors H, H' and $H^2$. Each of these bridges is located below one of the blank spaces $b^5$ on the distributer-bar, and the respective bridges are provided with the upright ribs or wards $h$ corresponding in form and arrangement to the notches in the matrices belonging to the respective fonts. It follows, therefore, that each matrix advancing over the bridges, will ride upon and be sustained by those bridges which do not have a corresponding arrangement of ribs or wards, and that the teeth in the upper end of the matrix will be compelled to engage the teeth of the distributer-bar, so that a matrix leaving one bridge will be suspended by the distributer-bar until it has advanced over the next bridge, and so on repeatedly. Until a matrix arrives over the corresponding bridge, it will be sustained first by the bridge beneath it, then by the teeth of the bar, then by the second bridge, and so on repeatedly. In other words, the bridges sustain the matrices while they are passing along the untoothed portions of the bar, and the teeth of the bar sustain them while they are passing over the opening between one bridge and the next. Thus it is that each matrix is continuously supported at the top and bottom alternately until it arrives at the corresponding bridge. Such bridge will permit the matrix to fall astride of its ribs or wards so that the teeth in the upper end of the matrix will be too low to again engage the teeth of the bar, and consequently the matrix, on leaving the bridge, will fall directly into the space between it and the next bridge. Thus it will be seen that matrices belonging to different fonts are permitted to fall at different points between the successive bridges.

After the matrices have been thus separated according to font and permitted to fall, it is necessary that they shall be delivered one at a time to the corresponding distributer-bars B, B', &c. This result is secured by employing slides which carry the matrices horizontally to positions beneath the appropriate bars, and further, by the use of vertical slides which thereafter lift the matrices to the bars. There is one pair of these slides for each of three distributers. Their form and mode of operation are shown in Fig. 14, in which I represents a horizontally moving slide, having at one end a vertical opening adapted to receive a matrix falling from the bridge above, and J is a vertically movable slide over which the matrix is presented by the slide I, and by which the matrix thus presented is lifted between the feed-screws above, in the manner shown in Fig. 7ª, to such height that they may be carried horizontally and directly into engagement with the teeth of the distributer-bar, as shown in Fig. 4, and on the extreme left in Fig. 5.

The cam which elevates the slide J, hereinafter described, is of such form that the slide remains at rest in its uppermost position for a brief interval, sufficient to permit the advance of the matrix therefrom into engagement with the distributer-bar, this movement being effected by the adjacent feed-screws, which engage the ears of the matrices.

All of the slides are mounted in guideways in a stationary casting or support K, shown in detail in Fig. 12, which also supports the bridges; the slots or guides for the horizontal slides being shown at $k$, $k'$. The vertical slides are also guided in the casting K. It will be understood that there is one of the vertical slides under the end of each distributer-bar, and that the horizontal slides move different distances so as to present their matrices over the respective vertical slides.

Motion may be communicated to the slides in any suitable manner, but I recommend the arrangement shown in Figs. 4, 5, 6, 7, &c., in which L represents a constantly driven horizontal shaft carrying on one end several pairs of cams M and N, which in turn act upon levers O and P; the former connected by a link $o$ to the horizontal carrier-slides, and the latter connected by links $p$ to the lifting slides J. Springs Q and R are connected by the respective levers with the frame, and tend to move the horizontal slides forward and the lifting slides upward. The cams effect the reverse movements of the slides in opposition to the springs, and control their forward movements.

The cams are so formed and timed, that each matrix falling from a bridge, is instantly carried edgewise horizontally by a carrier slide I, and then instantly lifted by a slide J between the distributing-screws above, by which the matrices are carried forward into engagement with the distributer-bar. As soon as this engagement occurs, the lifting slide descends.

As matrices for the same magazine will frequently fall in rapid succession, it is desirable that the horizontal carrier I shall return instantly to its receiving position after a matrix is lifted therefrom, and this without awaiting the descent of the lifting slide J. To this end, the lifting slide is cut away on one side in the manner shown in Fig. 14, and the end of the horizontal carrier made of such form and size that it may retreat horizontally through this cut-away portion of the lifting slide while the latter is in its elevated position, indicated by dotted lines.

In order to assist in guiding the matrices as they are lifted to the distributer-bars, and to assist in sustaining them as they move forward in engagement with the bar, I provide stationary blocks S, S', &c., fixed in position beneath the receiving ends of the distributing-screws. These blocks are separated by a sufficient distance to permit the upward passage of the matrices between them, and they are provided in their horizontal edges with notches $s$, through which the edges of the matrices pass.

It will be understood that the horizontal matrix-carriers I and the lifts J move independently, and that they act on the matrices only when the latter are dropped between the bridges. It may happen that a carrier-slide will move to and fro a number of times before receiving a matrix, and it may happen that two or more slides carrying matrices of different fonts will be in action concurrently, as one in no way interferes with another.

All of the distributer-bars may be of ordinary construction, except the receiving-bar, which has, in addition to the ordinary teeth, the supplemental or preliminary distributing teeth on its extended end, as before described. The matrices which are to be distributed to the magazine by this bar A, are made without notches in their lower ends, and are sustained and carried forward on the last bridge in the manner shown in Figs. 3 and 3ᵈ, being upheld until their teeth engage the ordinary distributive portion of the bar.

The composed line of matrices may be supported and delivered to the distributer-bar and its feed-screws by any suitable means, but I prefer to employ, as shown in the drawings, an ordinary distributer-box T, such as used in the commercial linotype machines, adapted to sustain the matrix line when introduced endwise, together with a horizontal pusher-slide U, by which the matrix line is urged forward so as to present the foremost matrix over the vertically reciprocating lifting-finger V actuated by the lever v. This finger serves to lift the matrices successively to such height that their upper ends are seated between the carrier screws and astride of the distributer-bar on a proper level to advance into engagement with the teeth.

*General operation.*—The general operation of the mechanism is as follows: The composed line, comprising matrices G from one, two or more of the magazines, is introduced into the distributer-box T and urged forward by the pressure-slide U until the forward matrix stands above the finger V. The finger acts to lift the forward matrix until its upper end is astride of the distributer and between the feed-screws, and its lower end at such height as to pass over the first bridge H. The screws immediately advance the matrix horizontally in a facewise direction and the finger descends to receive the next matrix. The elevated matrix, being carried forward by the screws, rides over the first bridge. If the notches in the lower end of the matrix fail to register with the ribs on the bridge, it will be sustained by said ribs at such height that its teeth will engage the teeth b of the distributer-bar. These teeth will sustain the matrix while it is moving forward over the gap between the first and second bridges and will prevent it from falling into the same. In other words, the teeth will support the matrix until it is advanced over the second bridge, by which it is in turn supported provided its notches fail to register therewith. In this manner, the matrix will be alternately supported at the upper and lower ends until finally it arrives at a point where the notches in the lower end will register with the ribs on the bridge, whereupon the ribs entering the notches in the matrix will permit the latter to fall slightly below its original level and far enough to prevent its teeth from engaging the next series of teeth on the distributer-bar. As a result of this, the advancing matrix, supported at the lower end only, will, as soon as it reaches the further side of the bridge, fall between said bridge and the next one.

In Fig. 3 six matrices are shown in the center line. The foremost matrix, notched to correspond with bridge H², has passed over the same without engaging the distributer bar, and has fallen to a lower level. A second matrix, without notches, is riding on top of the ribs of bridge H², and is sustained at such level that its teeth will again engage the bar B², and continue along the same. The third matrix, notched to correspond with bridge H', has fallen between the bridges H' and H². The fourth matrix, also notched to correspond with bridge H', is shown riding on the same at the low level, its teeth out of engagement with the distributer bar, so that it will in due time fall between the bridges H' and H². The fifth matrix, notched to correspond with bridge H, has passed over the same and fallen to a lower level. The sixth and last matrix, also notched to correspond with bridge H, is shown passing over the same without engaging the distributer bar, so that it will in due time fall between the bridges H and H'.

It will be observed that each matrix after passing over a bridge with corresponding ribs is permitted to fall and escape between that bridge and the next.

The matrices falling between the bridges and belonging on bars other than bar B², are carried horizontally in an edgewise direction to the right and left to positions beneath the appropriate distributer-bars, and over the lifting-slides J, by which they are raised one at a time their entire length between the guides S, S', S², and between the carrier-screws, and momentarily sustained at their final or highest level until they are carried horizontally into engagement with the teeth of the bars, along which they travel in the usual manner until released and permitted to fall into the appropriate channels of the respective magazines.

The blocks S, S', &c., are notched in their opposing edges, as shown in Fig. 12, so that the matrices may be lifted between them through the notches. Their upper surfaces between the notches are separated a distance less than the width of the matrices. When the lifting slide J ceases its upward movement and comes to a rest, its upper end, on which the lower end of the matrix stands, is flush with the surface of the adjacent blocks, so that the matrix may advance directly from the slide upon blocks and into engagement, at its upper end, with the distributer-bar.

It will of course be understood that the distributers may be of any appropriate construction provided they are adapted to cooperate with the separating and feeding devices herein described, and it will of course be understood that in place of the feed-screws, any other means of moving the matrices along the bars may be employed. The horizontal and vertical carrier-slides may also be modified in form and arrangement and operated by any suitable mechanism, provided they retain essentially the mode of action herein described.

I believe the present to be the first instance in which means for separating matrices and delivering them at different points according to font, having been combined with means for positively carrying said matrices to a different distributing mechanism. I also believe the present to be the first mechanism in which matrices have been lifted positively into engagement with propelling or carrying devices in position to directly engage a distributer-rail, or its equivalent, and it will be manifest to the skilled mechanic that the details may be widely modified without departing from the limits of my invention.

Having described my invention, I claim and desire to secure by Letters Patent:—

1. A distributer-bar of V-section provided with successive groups of matrix-sustaining teeth $b$, $b'$, &c., separated by intermediate untoothed portions $b^5$; whereby the bar is adapted to repeatedly sustain and release a matrix carried along it.

2. In combination, with matrices provided with distributing teeth in their upper ends, a distributer-bar of V-section having successive groups of teeth $b$, $b'$, &c., and intermediate untoothed portions $b^5$; whereby a matrix carried along the bar will be repeatedly suspended and released thereby.

3. A distributer-bar having successive groups of teeth $b$, $b'$, &c., adapted to engage and suspend the matrices, and untoothed portions between said groups, in combination with stationary matrix-supporting bridges of variant forms located beneath the untoothed portions of the bars with spaces between them; whereby matrices of variant forms advanced between the bar and the bridges are supported alternately at the upper and lower ends but permitted to fall between the different bridges according to form.

4. A distributer-bar having teeth $b$, $b'$, &c., and intermediate spaces, in combination with underlying bridges H, H', &c., differing in form.

5. In a distributing mechanism, a series of matrix-supporting bridges H, H', &c., having ribs $h$ differently arranged on the respective bridges, in combination with an overlying distributer-bar having longitudinal teeth adapted to release the matrices when passing over the bridges; whereby matrices of different fonts differing in form as between the fonts may be separated and delivered to different points.

6. In combination with a distributer-bar having discontinuous groups of teeth to suspend the matrices, underlying variant bridges to support the lower ends of the matrices, and means for feeding the matrices singly between the distributer-bar and the bridges, substantially as shown.

7. In a mechanism for distributing matrices according to font, the distributer-bar with discontinuous groups of teeth, underlying bridges of variant forms, means for advancing the matrices between the bar and the bridges and permitting them to descend between the latter, means for moving the fallen matrices laterally to different points, and means for lifting the matrices so moved to distributing mechanisms above.

8. In combination, a series of distributer-bars, means for carrying the matrices along said bars, means for moving the individual matrices right and left to positions below the distributers, and means for lifting said matrices singly to the distributer-carriers.

9. In combination with a toothed distributer bar, and means for moving the matrices along the same, a lifting device arranged to lift the individual matrices to the proper level for the engagement of their upper ends with the distributer bar, and momentarily sustain them at such level.

10. In combination with a toothed distributer bar, screws for moving the matrices along said bar, means acting beneath the lower ends of the matrices to lift them singly between the screws, and to the distributing level, and horizontal supports upon which the matrices ride as they are advanced from the lifting means.

11. In combination, a series of distributer-bars and corresponding fonts of matrices differentiated in form as between the different fonts, means for separating the matrices in a composed line according to font, means for moving the matrices so separated to positions beneath the respective distributers, and means for finally lifting the individual matrices to the distributing mechanisms.

12. In a distributing mechanism, means for delivering matrices of different fonts at different points, all of each font at the same point, in combination with horizontal carriers to move the matrices from said points, and means for lifting the matrices from the carriers.

13. In combination with the bridges H, H', &c., means for delivering matrices of different fonts between them, horizontal slides I, I, for shifting the matrices horizontally, slides J to lift the matrices, and distributing mechanisms in position to receive the matrices so lifted.

14. In combination with independent parallel distributers, means for separating a composed line of matrices according to the distributers for which they are intended, means for delivering the separated matrices edgewise to positions opposite the respective distributers, and means for delivering the matrices from said positions to the distributers.

15. In a distributing mechansim, the combination of means for separating the matrices in a composed line according to font, means for subsequently moving the matrices to different positions according to font, an independent distributing mechanism for each font, and means for delivering the matrices from said positions positively to the respective distributers.

16. In a distributing mechanism for matrices of different fonts, means for separating the individual matrices from the end of the composed line and dropping them in different positions according to font, overlying distributers one for each font, and means for positively carrying the separated matrices to the respective distributers.

17. In a mechanism for distributing matrices of different fonts, means for supporting a composed line and advancing the same endwise, means for lifting the matrices one at a time from the end of the line, means for advancing the separated matrices horizontally, means for dropping the matrices of different fonts at different points, means for moving the fallen matrices laterally to different positions according to font, means for lifting the individual matrices from said fonts, and distributers in position to receive the matrices so lifted.

18. In a distributing mechanism, the combination of a vertical and a horizontal matrix-carrying slide, and means for actuating said slides successively.

19. In a distributing mechanism, the combination of a horizontally movable carrier I, and a vertically movable carrier J, and the cam mechanism for actuating the same.

20. The combination of the vertical slide J, the horizontal slide I, formed or cut away as described to permit the return of the latter while the former remains in the elevated position; whereby the elevated matrix may be given a continuing support while the horizontal slide is being returned to receive a second matrix.

21. In combination with means for sustaining a matrix, a horizontal slide I, a vertical slide J, and levers, springs and cams for actuating said slides, substantially as described.

22. In a distributing mechanism for matrices of different fonts, the combination of means for advancing the matrices facewise and arresting them at different points according to font, means for positively carrying the matrices from said points in different paths, and distributing mechanisms in position to receive the matrices so carried.

23. In a distributing mechanism, the combination of parallel distributer-bars terminated at one end in different vertical planes, and one of said bars provided with a series of font-distinguishing teeth, means for delivering the matrices regardless of font to said bar, and means for carrying the matrices released from said bar at different points to the other distributer-bars.

24. In a distributing mechanism, a toothed distributer bar, adjacent screws to move the matrices along the bar, and means adapted to raise the individual matrices between the screws, to their uppermost position, said means adapted to pause momentarily while supporting the matrix in such position.

25. In a distributing mechanism, the combination of a toothed distributer-bar, means for moving the matrices along the bar, and means for lifting the matrices vertically to the bar and momentarily supporting them at their highest elevation.

26. In a distributing mechanism the combination of a toothed distributer bar, means for moving the matrices along the bar, means acting beneath the lower ends of the individual matrices to lift them to the distributing level, and momentarily sustain them at such level, and means for guiding the matrices during their vertical movement.

27. A toothed distributer-bar and means for feeding the matrices individually along said bar, in combination with means for positively lifting the individual matrices to the required level to engage the bar and momentarily maintain them at such elevation, and horizontal supporting surfaces adapted to receive and sustain the lower ends of the matrices as they are advanced from the elevating means.

28. In combination with means for delivering matrices thereto, independent horizontal carriers adapted to move the matrices to different points, and means for thereafter moving the matrices to different distributers.

29. In a distributing mechanism, the combination of a distributer-bar, means for feeding the matrices along said bar, a device for lifting the matrices individually to the carrying means and to the distributing level, and operating means whereby the lifting device is caused to rise and to remain momentarily at rest in its highest position.

30. The combination of a series of alternately placed selectors and receiving channels, means for advancing matrices across the selectors, stationary means for normally preventing the matrices passing into the receiving channels, said matrices when corresponding to the selectors being adapted to move into a position to clear said preventing means; whereby they may pass into said channels.

31. The combination with a series of nicked matrices, of a series of channels having open mouths side by side, a series of selectors placed between such mouths and having selective wards, means for advancing matrices across such wards and mouths, stationary means adapted to normally prevent the matrices entering the mouths, said matrices when corresponding to a selector moving to a position to clear such preventing means; whereby the advancement of the selected matrix allows it to pass into said mouths.

32. The combination of a series of channels having mouths opening upward, a series of selectors placed between such mouths and having selective wards extending upward, means for advancing matrices across such wards and mouths, stationary means adapted to normally support the matrices over the mouths, said matrices when corresponding to a selector dropping to a position to clear such supporting means; whereby the advancement of the selected matrix allows it to drop into said mouth.

33. The combination with a series of nicked matrices, of a series of channels having open mouths side by side, a series of selectors placed between such mouths and having selective wards, means for advancing matrices across such wards and mouths, and stationary means for normally preventing the matrices entering the mouths and adapted to permit the matrices to be moved to a position to clear them.

34. The combination of continuously moving carriers, and selectors and channels, mouths across which the matrices in the carriers pass, means for obstructing the mouths of the channels to prevent the matrices passing into improper channels, said selectors allowing the matrices when in registration to move to a position where they may clear said obstructions.

35. In a device for sorting matrices for a linotype machine, the combination of a support apertured to form a drop-channel, means for conveying matrices along the support, means for suspending matrices while passing over the drop-channel, and means on the support for guiding different matrices in different paths when approaching the channels.

36. In a device for sorting matrices for a linotype machine, the combination of a support apertured at intervals to form drop-channels, means for conveying matrices along the support, means for suspending matrices while passing over the drop channels, and means on the support for guiding the different matrices in different paths in advance of some of the channels so that some of the matrices are brought into engagement with the suspending means while others are allowed to enter the drop-channels.

37. In a device for sorting matrices for a linotype machine, the combination of means for feeding matrices, a support apertured at intervals to form drop-channels, means for conveying matrices along the support, means for suspending matrices while passing over the drop-channels, and means on the support in advance of each aperture for guiding certain of the matrices into engagement with the suspending means, and other means for so guiding other of the matrices that they enter the next drop-channel.

38. In a device for sorting matrices for a linotype machine, the combination of means for feeding matrices, a support apertured at intervals to form drop-channels, means for conveying matrices along the support, means for suspending matrices while passing over the drop-channels, wards on the support for guiding certain matrices in a different path from others in advance of some of the channels, so that some of the matrices are brought into engagement with the suspending means, while others are allowed to enter the drop channels.

39. In a device for sorting matrices for a linotype machine, the combination of means for feeding a line of matrices, means for separating one matrix at a time from the line, means for conveying the separated matrix, a support on which the conveyed matrices may travel having apertures to form drop-channels, means for suspending traveling matrices while passing over drop-channels but releasing them between drop-channels, means for removing the traveling matrices from the path of the suspending means when released, so as to permit them to fall into the succeeding drop-channel.

40. In a device for sorting matrices for a linotype machine, the combination of means for feeding a line of matrices, means for separating one matrix at a time from the line, means for conveying the separated matrix, a support on which the conveyed matrices may travel having apertures to form drop-channels, means for suspending traveling matrices while passing over drop-channels but releasing them between drop-channels, combination wards coöperating with nicks in the matrices by which the matrices may be guided into or out of engagement with the succeeding suspensory device when released.

41. In a device for sorting matrices for a linotype machine, the combination of a support apertured at intervals to form drop-channels, means for conveying matrices along the support, means for suspending matrices while passing over some of the drop-channels, means for guiding different matrices in different paths between the channels, and means for feeding the matrices one at a time to the conveying means.

42. In a device for sorting matrices for a linotype machine, means for feeding matrices, a combination bar divided into sections forming drop-channels, means for conveying matrices along the combination bar, a supporting bar over the combination bar, longitudinally extending teeth on the supporting bar cut away at intervals over the sections of the combination bar and adapted to engage matrices and support them while passing the drop-channels, wards on some of the sections adapted to guide some matrices into engagement with the supporting teeth, and to register with nicks in other matrices to the end that the latter avoid the support and enter the drop-channel next following the section of the combination bar with the wards of which their nicks register.

43. In a device for sorting matrices for a linotype machine, the combination of means for feeding matrices, a combination bar having wards, means for conveying matrices along the combination bar, drop-channels in the path of the matrices, a supporting bar having matrix-engaging teeth extending longitudinally thereof, a portion of the teeth being cut away to allow the matrices to rest on the combination bar in advance of some of the drop-channels.

In testimony whereof I hereunto set my hand this third day of December, 1907, in the presence of two attesting witnesses.

JOHN RAPHAEL ROGERS.

Witnesses:
DAVID S. KENNEDY,
ROBERT G. CLARK.